United States Patent [19]

Woodgate

[11] 4,321,031
[45] Mar. 23, 1982

[54] METHOD AND APPARATUS FOR CONDENSATION HEATING

[76] Inventor: Ralph W. Woodgate, 1380 Grande Allee, Carignan, Canada

[21] Appl. No.: 167,151

[22] Filed: Jul. 8, 1980

[30] Foreign Application Priority Data

Jul. 9, 1979 [GB] United Kingdom ............... 23904/79
Oct. 4, 1979 [GB] United Kingdom ............... 34554/79

[51] Int. Cl.³ .......................... F27D 3/00; F22B 1/28; F27B 9/04
[52] U.S. Cl. ......................................... 432/11; 34/79; 34/219; 219/271; 219/275; 432/23; 432/152
[58] Field of Search ........................... 34/79, 216, 217; 228/180 R; 165/105, 104.21, 104.23; 432/11, 23, 152; 219/271, 273, 274, 275

[56] References Cited

U.S. PATENT DOCUMENTS

| | | | |
|---|---|---|---|
| 3,745,670 | 7/1973 | Hartwig | 34/217 |
| 3,914,096 | 10/1975 | Schladitz | 219/274 |
| 4,077,467 | 3/1978 | Spigarelli | 165/105 |

Primary Examiner—John J. Camby
Attorney, Agent, or Firm—Darby & Darby

[57] ABSTRACT

A method and apparatus for condensation heating. Articles to be heated are conveyed into a heating chamber which is filled with vapors of a fluid having a relatively high boiling point. When the vapors contact the article to be heated they condense thereon and transfer the latent heat of vaporization, thus heating the object. Vapors escaping from the heating chamber are trapped by flows of carrier gas at the inlet and outlet of the heating chamber. The carrier gas, which is thus partially saturated with vapor, is channeled into a gas/vapor separator wherein the vapor is extracted and recycled back to the heating chamber.

29 Claims, 4 Drawing Figures

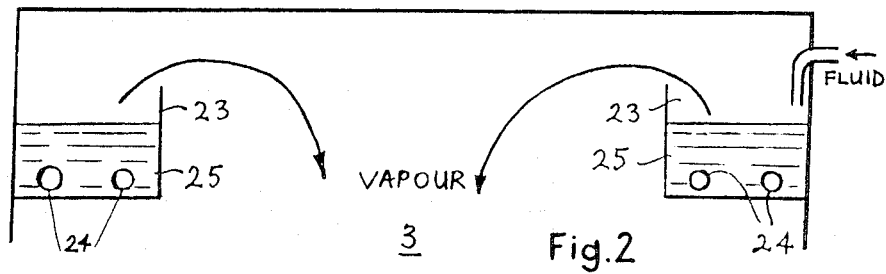
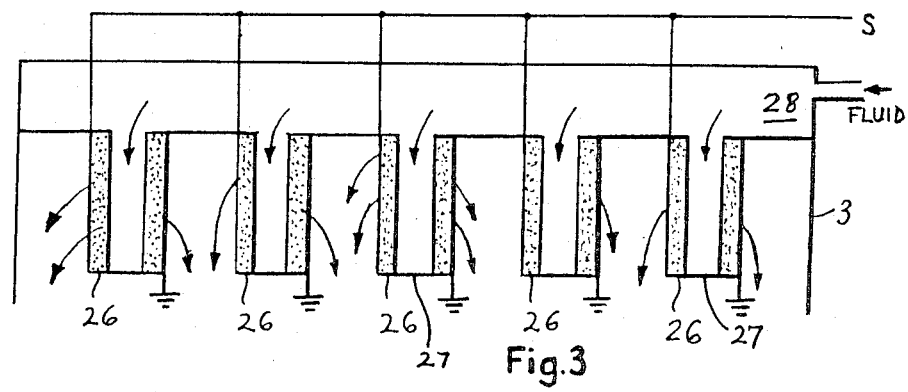
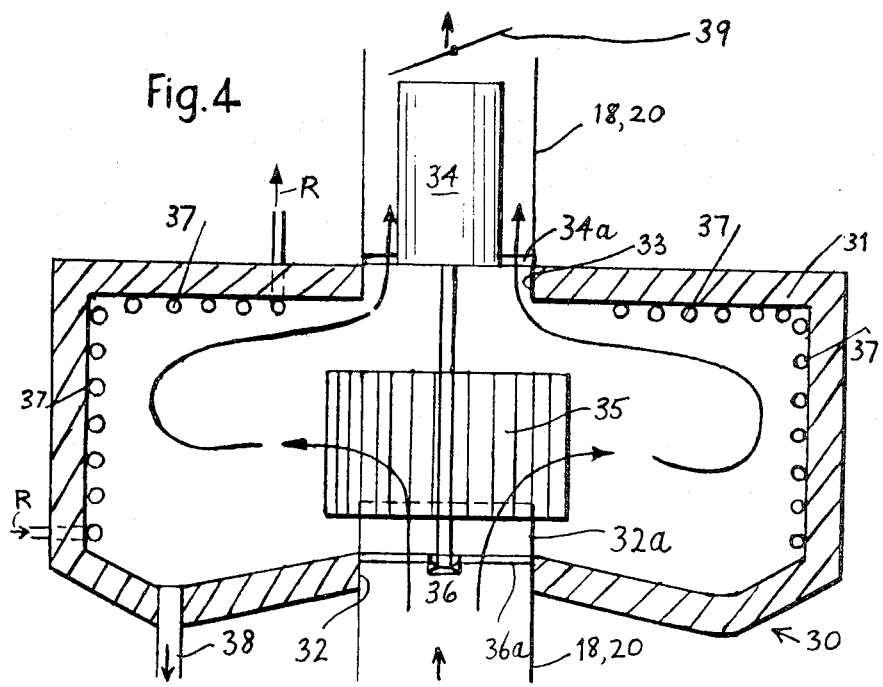

METHOD AND APPARATUS FOR CONDENSATION HEATING

BACKGROUND OF THE INVENTION

1. Field of the Invention

This invention relates to a method and apparatus for effecting condensation heating, and more specifically, for vapor phase or reflow soldering, sometimes known as condensation soldering. This is a process wherein the vapors of a high temperature boiling point liquid are allowed to contact the objects or components to be soldered, such as printed circuit boards or other electronic devices. The latent heat of vaporization given up when the vapors condense on the object quickly raise its temperature and cause any solder, tin, alloy or tin-lead electroplate, or other similar material thereon to melt and flow. It is particularly desirable to accomplish this end with minimal loss of the heat transfer fluid, and maximum utilization of energy conserving potential from the heat transfer stages of the device.

2. Description of the Prior Art

Many processes, such as curing, cooking, fusing and brazing, as well as soldering, require that articles be rapidly heated to elevated temperatures. Although the background of the present invention is most readily understood in the context of soldering, its application is not to be construed as limited to soldering.

Several methods and apparatuses have been disclosed in the prior art for effecting solder reflow operations on printed circuits through the use of hot saturated vapors. One such device is disclosed in R. C. Pfahl, Jr. et al, U.S. Pat. No. 3,866,307, issued Feb. 18, 1975. Circuit boards are loaded on to a conveyor and moved downward into a chamber containing hot saturated vapors of a high boiling point fluid such as a fluorinate hydrocarbon, which is relatively expensive. As the circuit boards pass through the vapors they are heated to a suitable temperature for soldering. The heated boards may also then be passed over a solder wave at a low point of the conveyor catenary, which is positioned to allow the solder to contact the component leads and the conductive material on the boards. The soldered boards continue to travel upward past the vapors and out through a port located at or near the top of the chamber.

To limit the loss of expensive heat transfer fluid through the entry and exit ports, the device provides condensation coils to condense the escaping vapors and return them to the chamber. One problem resulting from this approach is that the conveyor cannot follow a horizontal path but must carry the circuit boards downward into the vapor chamber and then upward to and through the exit port. This down and up motion is industrially inefficient and results in pooling of solder at the trailing edge of the circuit boards due to the slanting of the boards on the conveyor belt. Another problem is that despite the use of condenser coils a substantial quantity of heat transfer fluid which has condensed on the boards and the conveyor is carried out of the chamber.

Another device disclosed in T.Y. Chu et al, U.S. Pat. No. 3,904,102 issued Sept. 9, 1975 attempts to reduce loss of the relatively expensive heat transfer fluid by use of a secondary blanket of a vapor of a less expensive fluid atop the primary vapor zone. While this device reduces the loss of heat transfer fluid, a considerable amount is still carried out with the circuit boards. Further, this device also utilizes the up and down, slanted conveyor path described in the Pfahl patent above.

U.S. Pat. No. 4,032,033, T.Y. Chu et al, discloses a solder reflow apparatus which adds a quenching operation to cool the circuit board after the soldering or reflow has been completed.

Another related application of vapor phase soldering is disclosed in H.H. Ammann, U.S. Pat. No. 4,115,601 issued Sept. 19, 1978. This device heats a pre-tinned, flexible printed circuit board to the point where the solder thereon will fuse with the conductive foil etched on the printed circuit board. The Ammann apparatus is designed so that the vapor heating/solder melting phase is carried out while the flexible printed circuit board is moving in a horizontal plane, thus eliminating the solder pooling effect inherent in the two patents discussed previously. However, the Ammann patent has the limitation that it can only be used to solder bare flexible printed circuit boards without components or surface irregularities, and is not equipped to handle rigid printed circuit boards or boards with components mounted thereon. Furthermore, the circuit board path described by the Ammann patent is only horizontal during the solder heating phase. The overall conveyor path follows a sequence of numerous sharp bends which may make the device prone to mechanical failure, construction difficulties and the aformentioned industrial inefficiency cited in the two previous references.

OBJECTS OF THE INVENTION

One of the objects of this invention is to provide an improved method and apparatus for condensation heating particularly for rapid and economical mass operations.

A further object is to provide an improved method and apparatus for vapor phase soldering of all types of printed circuit boards or other similar objects, and especially rigid circuit boards with components mounted thereon.

Another object is to provide a method and apparatus for vapor phase soldering or fusing in which all steps of soldering or fusing are performed in a generally horizontal path and carried out without excessive leakage of heat transfer fluid.

An additional object is to provide a method and apparatus for separating the vapors of the heat transfer fluid from a less dense gas, such as air, so the fluid may be recycled.

Yet a further object is to improve the energy efficiency of a method and apparatus for condensation heating by recycling the heating and cooling effects associated with the heat transfer stages inherent in the device or process.

SUMMARY OF THE INVENTION

In accordance with the invention, a method and apparatus for heating are provided wherein articles to be heated are carried through a multi-stage device on a conveyor. In a first stage is a pre-heating chamber wherein directed streams of warm air are passed over the conveyor path and the articles. The air preheats the articles to prepare them for the rapid condensation heating. In a second stage is a heating chamber in which a vapor generator sends hot vapor over the path, heating the articles to the desired temperature. In the third stage is a drying and cooling chamber wherein streams of warm air are again passed over the articles removing any fluid vapors condensed thereon. The air flows in the first and third stages are directed to reduce the loss of fluid vapors from the reflow chamber and to catch the escaping vapors and direct them past condensing coils for collection and reuse. The falling vapors in the reflow chamber are likewise condensed by coils below the conveyor path and returned to the vapor generator. In an alternate embodiment an air/vapor separation device is used to remove the remaining vapors from the air leaving the first and third stages after passage over the condensing coils.

BRIEF DESCRIPTION OF THE DRAWINGS

In order that the invention may be more clearly understood, reference will now be made to the accompanying drawings, in which:

FIGS. 2 and 3 show two alternative forms of the vapor generating means; and

FIG. 4 is a cross-section through one embodiment of an air/vapor separating device according to the invention.

DESCRIPTION OF THE PREFERRED EMBODIMENT

Figure 1:
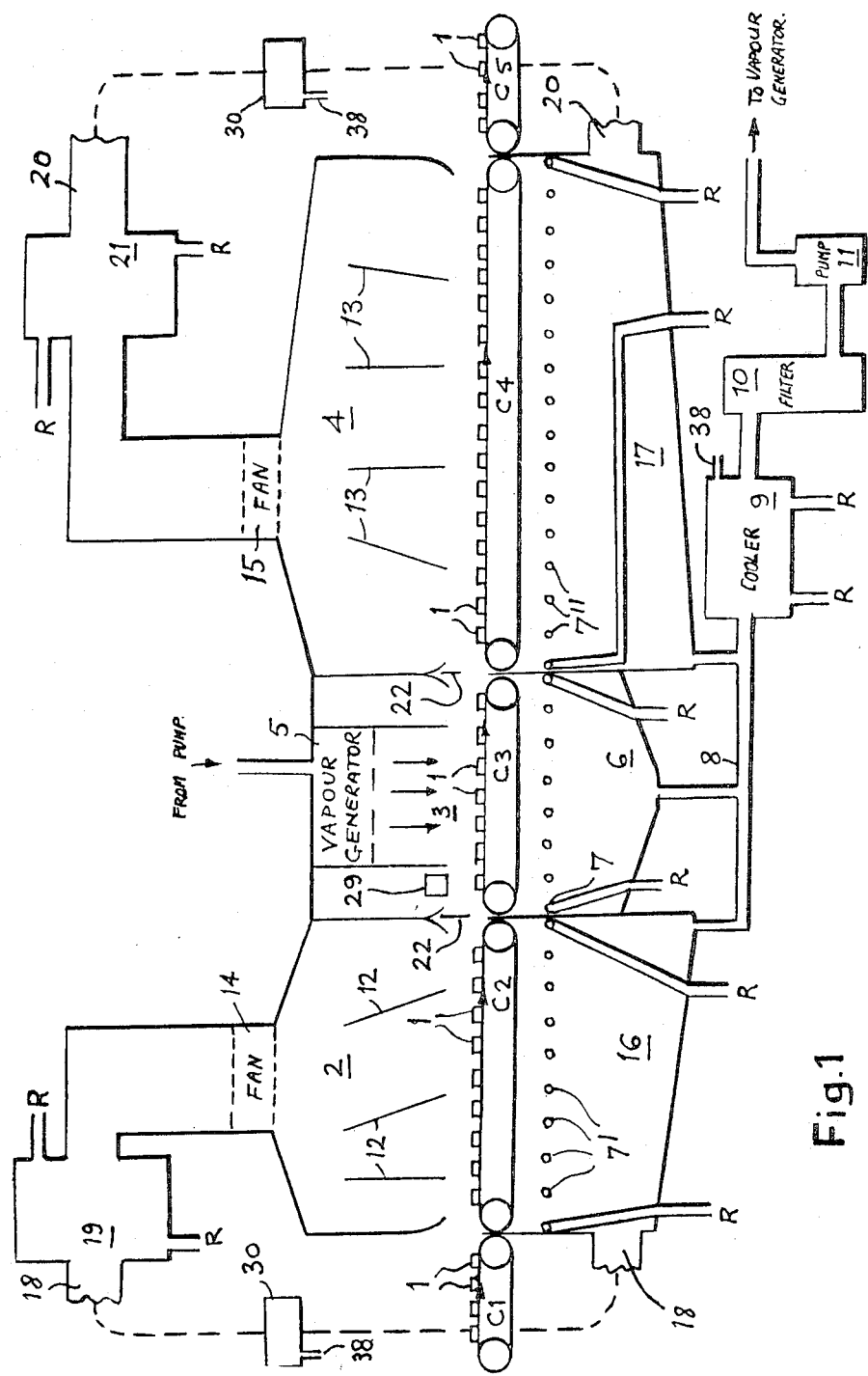
FIG. 1 is a schematic showing of one embodiment of an apparatus according to the invention.

Referring to FIG. 1, the objects 1 to be heated, here illustrated as printed circuit boards with pre-tinned electrical conductors, or meltable circuits or solder preforms or the like or ceramic substrates, are conveyed on a horizontal screen conveyor system C1, C2, C3, C4 and C5 in succession through a pre-heat chamber 2, a reflow chamber 3, and a drying chamber 4.

The objects, with or without components or the like mounted thereon are carried up to the entrance of the pre-heat chamber 2 by conveyor C1 and are then transferred to conveyor C2. The objects are carried by conveyor C2 through preheat chamber 2, and warmed by a flow of air from fan 14 which is heated in heater 19 to a point above room temperature but below the solder melting temperature. This helps reduce the shock of the heat in the reflow chamber. They are then transferred from conveyor C2 to conveyor C3, and conveyed through the reflow chamber 3.

Vapors of a heat transfer liquid having a high boiling point, e.g. fluorinated hydrocarbons such as Dupont FREON-E5 or 3M FC70, are generated by a vapor generator 5 in the upper part of the reflow chamber 3 above the conveyor C3. The vapors fall under the influence of gravity over the objects in the treatment zone condensing thereon and heating them by transfer of the latent heat of vaporisation, causing solder, low temperature melting alloys or similar material on the objects to melt and flow.

The remaining vapors fall into a cooled collecting zone 6 equipped with cooling coils 7 where the vapor is condensed. This condensate passes into a pipe 8 and, after further cooling in a cooler 9 and filtering in a filter 10, is recycled by the pump 11 to the vapor generator 5.

After the reflow operation has been carried out, the boards are conveyed from the reflow chamber 3 to the drying chamber 4 by coneyors C3 and C4. In drying chamber 4 another flow of warm air produced by heater 21 and fan 15, is passed over the boards to remove the vapors which have condensed thereon during the reflow stage. Preferably this flow of air is warm enough to evaporate the condensed vapor but cooler than the melting point of the solder. This will permit the flow of air to simultaneously dry the boards while cooling and solidifying the solder. After drying, the boards are transferred from conveyor C4 to conveyor C5 for exit from the device.

Loss of vapor from the treatment zone is prevented, or at least substantially eliminated, by two series of air curtains defined by baffles 12, 13 in the chambers 2 and 4 respectively. The baffles may be set at varying angles to create forward and reverse venturi effects, thus controlling the speed and direction of airflow in order to maximize vapor retention in the reflow chamber. Heated air is circulated through these baffles by fans 14, 15 respectively and is collected in lower sections 16, 17 of of chambers 2 and 4 below the conveyor sections C2, C4 respectively, after being cooled by the respective collecting coils 7', 7" to condense any vapor. Air collected in the chamber section 16 is returned via the duct 18 to the inlet of the air heater 19 connected to the fan 14. Likewise, air collected in the chamber section 17 is returned via the duct 20 to the inlet of the air heater 21 connected to the fan 15.

An important feature associated with the use of these "air curtains" is the ability to use a substantially horizontal and linear conveying path while preventing excessive loss of the vapors of the heat transfer liquid. The condensation coils used in prior art to prevent vapor loss cannot provide an effective vertical vapor seal at the entrance and exit of the reflow chamber, which must be done if the conveyor is to follow a substantially linear path.

Those skilled in the art will see that these air curtains can be created by various other methods such as air jets. It is preferred that the velocity of air in the air curtains vary along the length of the circuit boards through both heating and cooling. For example, the velocity would increase from the entry into chamber 1 to the exit therefrom. The velocity would decrease from the entry of chamber 4 to the exit from the device. The air curtains are preferably vertical at the inlet and outlet of the working chamber 3.

Residual vapor which is not condensed by the cooling coils 7' and 7" may be extracted by channeling air from the sections 16 and 17 of chamber 2 and 4 into air/vapor separators 30 and returned to the cooler 9 via pipes 38 for reuse. A preferred embodiment of this air/vapor separator is shown in FIG. 4, and described hereafter.

The recirculated air may be heated, at least partially, by the heat removed by the vapor condensation process. A refrigerant is circulated through the cooling coils 7, 7' and 7" and cooler 9 to condense and cool the working fluid, and thereafter may be used to heat the air in air heaters 19 and 21. Refrigerant connections are shown at R. Additional cooling or heating may be provided as necessary.

Since the chambers operate at different temperatures, the conveyor is preferably split into sections as shown such that each section will be contained within one temperature area and avoid removing heat from that particular area. This helps conserve the energy otherwise used in heating and cooling a single conveyor as it passes through the stages of the device. The use of multiple conveyors also helps prevent loss of vapors from the reflow chamber which would ordinarily condense on the conveyor and be carried out. For example, in the illustrated embodiment the first conveyor section C1 will take the objects to be heated up to the heated air curtains at the entrance to the preheating chamber 2. The second C2 through the pre-heat chamber and up to the treatment chamber; the third C3 through the treatment chamber; the fourth C4 through the drying chamber; and the fifth C5 will remove the objects from the machine.

The object to be heated will have to remain in the working vapor until it reaches the required processing temperature. This time will be dependent on the thermal capacity of the object, and the supply of vapor and the type of material being heated to a flowable state. To accommodate large items without requiring an excessively long chamber or very low conveyor speeds, it is proposed that the conveyors be capable of independent control and intermittent motion whereby the object is conveyed rapidly into the working chamber and may remain stationary until the solder or other material has completely melted. This intermittent action may be synchronised with the operation of shutters 22 to close off the treatment chamber during the actual heating period and the intermittent operation of the vapor generator to match the volume of vapor generated, to the thermal requirements of the object to be heated.

In the illustrated embodiment, a photoelectric device 29 or equivalent proximity sensing means is used to detect the entry of articles into the reflow chamber, and signal the closing of shutters 22 and stopping of conveyor C3. A timing device (not shown), preset by the operator according to the thermal capacity of the boards, may signal the opening of the shutters 22 and reoperation of conveyor C3.

Those skilled in the art will recognize that the reflow chamber of this embodiment is designed for use with printed circuit boards with pre-applied solder, tin or the like, or other work pieces. An alternate embodiment may include a soldering means such as a wave of liquid solder located in the heating chamber to contact the object. This invention is therefore not limited to the use of pre-tinned circuit boards or other pre-tinned assemblies.

The vapor generator 5 may employ any method of heating the heat transfer liquid and allowing the vapors to cascade into the treatment zone. A vapor generation device may include a vessel 23 as shown in FIG. 2 with immersion type electrical resistance heaters 24 and an opening to allow the vapor of the high boiling point fluid 25 to flow by gravity into the treatment zone. However, this apparatus suffers from the time lag in producing vapor at startup, and in increasing or reducing the rate of production of vapor.

Preferably, according to a feature of the invention, the vapor is generated by one or more electrically heated tubes 26 of porous conductive material as shown in FIG. 3. The working fluid is fed to the interiors of a plurality of tubes 26 of electrically conductive porous material having interconnecting pores and heated from a supply of electricity S which is under the control of suitable switching circuits (not shown). The fluid is vaporized in passing through the heated porous walls of the tubes and discharged into the top of the treatment chamber 3. This method produces the vapor almost immediately when it is actually required, and allows almost instantaneous control of the volume of vapor generated. This results in further energy and cost saving aspects of the invention over conventional steady state-type heating devices. Control of the generator may be effected by photoelectric device 29 or other proximity sensing means to generate vapor only when an object is in the treatment chamber.

A preferred embodiment of the air/vapor separator 30, is shown in detail in FIG. 4. It includes a centrifugal fan device, the rotation of which throws the air/vapor mixture fed to the chamber radially outward towards a cooling surface or surfaces, the chamber having an outlet for condensed vapor and another outlet for the separated air.

To achieve efficient separation, the separator makes use of two characteristics of the vapor, viz, the much higher density of the vapor compared to air (10 to 20 times) and of the high boiling point of the working fluid.

The separator shown comprises a annular chamber 31 having a central inlet duct 32 in its base, through which the air/vapor mixture enters the chamber, and a central outlet duct 33 in its top wall through which separated air is discharged. Within the chamber and aligned with the ducts 32, 33 is a centrifugal fan 35 driven by an electric motor 34 located in the outlet duct 33. The motor and fan are supported, for example, by radial arms 34A and 36A between the motor 34 and the wall of the duct 33 and between the fan bearing 36 and the wall of the duct 32, respectively. This permits air to flow around the motor 34 and the fan bearing 36 and through the central outlet duct 33.

Around the inside of the peripheral and top walls of the chamber are mounted cooling coils 37 through which circulates a cooling liquid or refrigerant. Refrigerant connections are shown at R. Vapor which condenses in the chamber is discharged through a pipe 38 arranged to connect with an annular channel around the base of the chamber 31.

In operation a fan (not shown) causes the air/vapor mixture from ports 18 and 20 of the soldering apparatus to enter the chamber 31 through the inlet duct 32 and pass to the rotating centrifugal fan 35. The air/vapor mixture is thrown radially outwardly by the fan, and because of the higher density of the vapor the ratio of vapor to air will increase towards the peripheral cooling coils in the chamber. The vapor condenses in the coils and drains down to the pipe 38 through which it is taken off to a suitable reservoir from which it can be pumped for filtration, water separation and subsequent reuse.

The separated air will be displaced from the chamber by the incoming mixture and exits through the outlet duct 33. The flow of air/vapor mixture can be regulated by a damper 39, and, together with the motor speed, will be adjusted to provide maximum separation depending on the prevailing parameters of the air/vapor mixture.

It will be understood that the separating device according to the invention may be used in connection with vapor phase soldering device other than that described in our aforesaid application. It may further be used in any application which requires the separation of a relatively high density vapor from a relatively low density gas, in fields not related to vapor phase soldering. Two or more separating devices can be mounted in series to obtain more complete separation, and the centrifugal fan may be driven from a motor or source of motive power disposed externally of the chamber.

What is claimed is:

1. A condensation heating apparatus comprising:
   means defining a chamber having a heating section, said heating section having an inlet and outlet, said chamber further having an entrance and an exit;
   means for carrying articles to be heated through said chamber;

vapor input means for introducing a quantity of heat transfer vapor into said heating section;

means for creating a flow of carrier gas relative to said chamber which mixes with the heat transfer vapor escaping from said heating section to produce a flow of gas/vapor mixture, means located in the path of said gas/vapor flow for extracting heat transfer vapor.

2. A heating apparatus as in claim 1 wherein said carrying means is generally horizontally oriented at least through said heating section of the chamber.

3. A heating apparatus as in claim 1 wherein said carrying means is generally horizontally oriented from the chamber entrance to the chamber exit.

4. A heating apparatus as in claim 1 further comprising:
cooling means disposed below the carrying means in said heating section of said chamber to condense falling heat transfer vapor; and
means for collecting condensed vapors from said cooling means.

5. Heating apparatus as in claim 4 wherein said chamber further includes:
a preoperative section with a first output port and at least part of said means for creating a flow of carrier gas defined therein, to channel the carrier gas over the carrying means and through the first output port, to produce a gas flow; and
a post-operative section with a second output port and at least part of said means for creating a flow of carrier gas defined therein, to channel the carrier gas over the carrying means and through the second output port, to produce a gas flow.

6. Heating apparatus as in claim 5 wherein said means for creating a flow of carrier gas includes means for directing at least part of said gas flow of said preoperative section toward said heating section inlet and means for directing at least part of said gas flow of said postoperative section toward said heating section outlet to reduce dispersion of heat transfer vapors therefrom.

7. Heating apparatus as in claim 6 wherein said means for creating a flow of carrier gas includes baffles in said preoperative and post-operative sections to regulate the direction and velocity of the gas flows.

8. Heating apparatus as in claim 7 further comprising means to recycle the condensed vapors from said cooling means and said heat transfer vapor extraction means to said vapor input means.

9. Heating apparatus as in claim 7 wherein said conveyor means comprises a plurality of carrying segments, each segment being located to carry articles only through a respective one of said sections of the device.

10. A heating apparatus as in claim 9 wherein said gas flows of said preoperative and postoperative sections are heated by carrier gas heating means prior to their passage over said conveyor means.

11. A heating apparatus as in claim 10 further comprising cooled condensation tubes for extracting the heat transfer vapor from the gas flows of said preoperative and post-operative sections, said cooling means also including cooled condensation tubes.

12. A device according to claim 11 wherein said carrier gas heating means further includes means for transferring heat from said cooled condensation tubes to said gas flows.

13. Heating apparatus as in claim 12 further comprising:

shutter means at the inlet and outlet of said heating section;

control means responsive to the entry of articles into the heating section of the chamber to close the shutter means and stop the motion of said conveyor segment of said heating section; and heat cycle time setting means to open the shutter means and start the motion of said conveyor segment of said heating section after a preset heat cycle time has elapsed after closing of the shutter means.

14. Heating apparatus as in any one of claims 1, 11 or 12 or 13 wherein said heat transfer vapor extraction means further comprises:
a separation chamber with a gas/vapor input port defined therein, and fed by said gas/vapor flow;
means located in said separation chamber for imparting a centrifugal motion to said gas/vapor flow;
means for cooling the walls of said separation chamber;
means for collecting condensed vapors from the walls of said separation chamber;
a carrier gas output port defined in said separation chamber to permit the output of carrier gas after extraction of said heat transfer vapor therefrom.

15. Heating apparatus as in claim 14 wherein said vapor input means comprises:
vaporization elements of porous material having interconnected pores;
means for heating said elements;
means for directing a flow of heat transfer fluid into said elements for vaporization;
means for controlling the interaction of said fluid feed means and said element heating means according to the entry and exit of said articles relative to said heating section.

16. Heating apparatus as in claim 1 wherein said heat transfer vapor extraction means further comprises:
a separation chamber fed by said gas/vapor flow;
means located in said separation chamber for imparting a centrifugal motion to said gas/vapor flow;
means for cooling the walls of said separation chamber;
means for collecting condensed vapors from the walls of said separation chamber;
a carrier output port defined in said separation chamber to permit the output of carrier gas after extraction of said heat transfer vapor therefrom;
and wherein said vapor input means further comprises:
vaporization elements of porous material having interconnected ports;
means for heating said elements;
means for directing a flow of heat transfer fluid into said elements for vaporization;
means for controlling the interaction of said fluid feed means and said element heating means according to the entry and exit of said articles relative to said heating section.

17. Heating apparatus as in claim 1 wherein said vapor input means comprises a vessel with heat transfer fluid therein, and heating means immersed in said fluid.

18. Heating apparatus as in claim 5 wherein said means for introducing carrier gas in each of said preoperative and postoperative sections produces a substantially vertical flow at the inlet and outlet of said heating section.

19. Heating apparatus as in claim 9 wherein all of said carrying segments are generally horizontally oriented.

20. A gas/vapor separation device, comprising:
a separation chamber fed by a carrier gas flow partially saturated with a fluid vapor;
means located in said separation chamber for imparting a centrifugal motion to said carrier gas flow;
means for cooling the walls of said separation chamber;
means for collecting condensed fluid vapor from the walls of said separation chamber;
an output port defined in said separation chamber to permit the output of carrier gas after extraction of said heat transfer vapor therefrom.

21. A vapor condensation soldering apparatus comprising:
a heating section with at least one port means for providing entry and exit of articles to be soldered in said heating section;
vaporization elements of porous material having interconnected pores;
means for heating said elements;
means for directing a flow of fluid into said elements for vaporization;
means for controlling the interaction of said fluid feed means and said element heating means according to the entry and exit of said articles relative to said heating section.

22. A device according to claim 21 wherein said vaporization elements are made of electrically conductive material.

23. A method for condensation heating of articles comprising:
carrying articles to be heated in a condensation chamber having an entrance, an exit and a heating section;
introducing a quantity of heat transfer vapor into said condensation chamber to condense on said articles and transfer heat thereto;
creating a flow of carrier gas relative to the chamber, said carrier gas mixing with heat transfer vapor escaping from said heating section to produce a flow of gas/vapor mixture;
collecting said flow of gas/vapor mixture and extracting the vapors from said flow for reuse.

24. A method for extracting vapor from a gas comprising:
channeling a flow of gas which is partially saturated with a vapor to be extracted into a centrifugal fan;
regulating the speed of said fan so that particles of said vapor are thrown toward condensing walls surrounding said centrifugal fan;
collecting the condensed vapor from said condensation walls and channeling the remaining gas flow to an output port.

25. A soldering method comprising:
heating an electrically conductive porous material having interconnected pores by applying an electric current thereto;
introducing fluid to be vaporized into said porous material to form a heat transfer vapor; and
applying said heat transfer vapor to an article to be soldered.

26. Heating apparatus as in claim 13 wherein said heat transfer vapor extraction means further comprises:
a separation chamber with a gas/vapor input port defined therein, and fed by said gas/vapor flow;
means located in said separation chamber for imparting a centrifugal motion to said gas/vapor flow;
means for cooling the walls of said separation chamber;
means for collecting condensed vapors from the walls of said separation chamber; and
a carrier gas output port defined in said separation chamber to permit the output of carrier gas after extraction of said heat transfer vapor therefrom;
and wherein said vapor input means comprises:
vaporization elements of porous material having interconnected pores;
means for heating said elements;
means for directing a flow of heat transfer fluid into said elements for vaporization; and
means responsive to said control means, said heat cycle time setting means, and to the conveying of the articles through the chamber, to direct a flow of heat transfer fluid into said elements approximately when said shutter means closes and to stop said flow approximately when said shutter means opens.

27. A condensation heating apparatus comprising:
means defining a chamber having a heating section with an inlet and outlet defined therein;
means for carrying articles to be heated through said chamber;
means for introducing a quantity of heat transfer vapor into the heating section of the chamber;
shutter means at the inlet and outlet of said heating section;
control means responsive to the entry of articles into the heating section of the chamber to close the shutter means; and
heat cycle time setting means to open the shutter means after a preset heat cycle time has elapsed after closing of the shutter means.

28. A condensation heating apparatus comprising:
means defining a chamber having a heating section, said heating section having an inlet and outlet, said chamber further having an entrance and exit;
means for carrying articles to be heated through said chamber;
vapor input means for introducing a quantity of heat transfer vapor into said heating section, comprising vaporization elements of porous material having interconnected pores, means for heating said elements and means for directing a flow of fluid into said elements for vaporization;
means for controlling the interaction of said fluid feed means and said element heating means responsive to the entry and exit of said articles relative to said heating section;
means for creating a flow of carrier gas relative to said chamber which mixes with the heat transfer vapor escaping from said heating section to produce a flow of gas/vapor mixture; and
means located in the path of said gas/vapor flow for extracting heat transfer vapor.

29. A method as in claim 25, wherein said condensation soldering apparatus comprises a heating section with at least one port means for providing entry and exit of articles to be soldered in said heating section, and further comprising the step of:
controlling the heating of said porous material and the introduction of fluid into said porous material responsive to the entry and exit of said articles relative to said heating section.

* * * * *